W. A. NYE.
INSECT TRAP.
APPLICATION FILED AUG. 16, 1913.

1,124,642.

Patented Jan. 12, 1915.

Witnesses:
Leonard A. Powell
Sydney E. Taft

Inventor:
William A. Nye.
by his attorney

UNITED STATES PATENT OFFICE.

WILLIAM A. NYE, OF BOURNEDALE, MASSACHUSETTS.

INSECT-TRAP.

1,124,642.

Specification of Letters Patent.

Patented Jan. 12, 1915.

Application filed August 16, 1913. Serial No. 785,021.

*To all whom it may concern:*

Be it known that I, WILLIAM A. NYE, a citizen of the United States, residing at Bournedale, in the county of Barnstable and State of Massachusetts, have invented new and useful Improvements in Insect-Traps, of which the following is a specification.

This invention relates to insect traps, and particularly to traps for catching all classes of winged insects.

The object of the invention is to provide a device having an insect attracting member over which flows a thin film of liquid which is adapted to remove the insects which alight upon said attracting member or to disable said insects whereby they are prevented from escaping.

The object of the invention is further to provide means to receive the insects which are removed from said attracting member; said latter means being provided with a suitable liquid which puts to death all insects entering the same, said means furthermore being provided with an overflow, whereby superfluous liquid may be permitted to escape therefrom.

The invention consists in the combination and arrangement of parts whereby the above objects and certain other objects hereinafter appearing are attained as set forth in the following specification and particularly pointed out in the claims.

Figure 1:
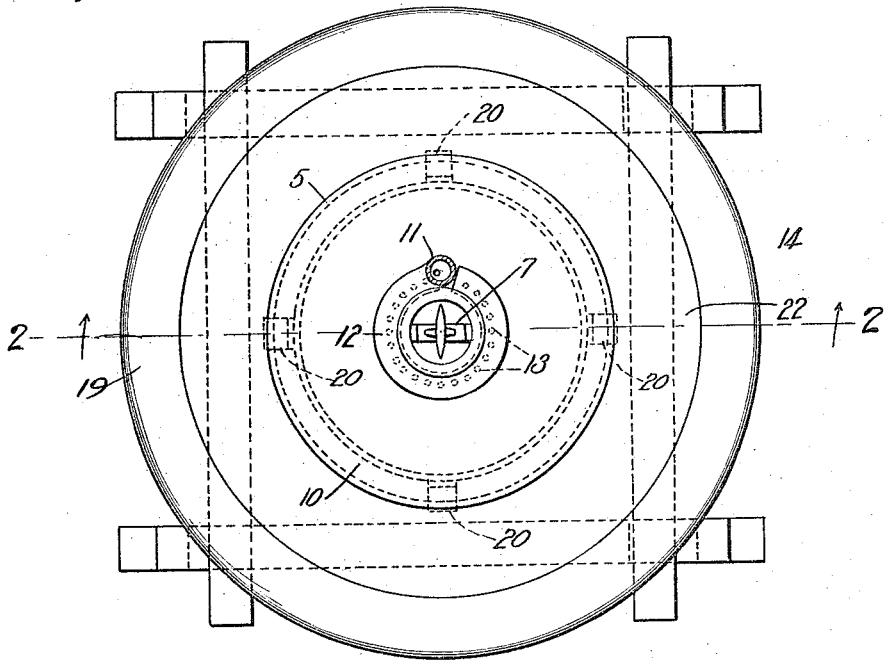
Figure 2:
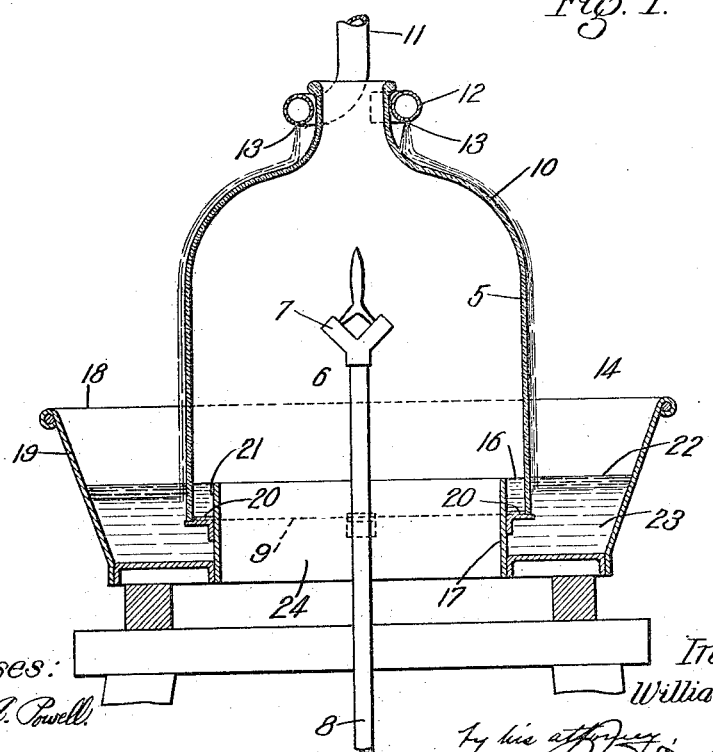

Referring to the drawings:—Figure 1 is a plan view of a device embodying my invention. Fig. 2 is a sectional elevation of the device illustrated in Fig. 1 taken on the line 2—2 of said figure.

Like numbers refer to like parts in both views of the drawings.

In the drawings 5 is an insect attracting member which is preferably constructed in the form of a globe and transparent, or at least sufficiently so to permit rays of light to pass therethrough from light creating instrumentalities 6 arranged within said globe.

The light creating instrumentalities preferably consist of a gas burner 7 and a gas supply pipe 8 extending to said burner 7 through an opening 9 at the bottom of said globe 5, said supply pipe extending to a suitable reservoir not shown in the drawing. The rays of light from the burner 7 are permitted to shine outwardly through said globe 5 and in so doing attract insects thereto, the course of said insects toward said light being interrupted by the globe 5 upon whose exterior surface 10 they alight. A film of liquid is deposited upon the globe 5 against the outer surface 10 thereof, preferably by means of a pipe 11 terminating at its lower end in a coil 12, which encircles the upper end of said globe. The coil 12 is provided in its lower surface with a series of discharge orifices 13 which permits the liquid to escape from said supply pipe to said globe in a plurality of jets, thus maintaining a continuous flow of liquid in a thin film downwardly over the outer surface 10 of said globe 5. A catch basin 14 is arranged beneath said attracting member or globe in close proximity thereto and in such a relation to said globe that the insects which are removed from the outer surface of said globe will be caught thereby. The liquid employed to remove the insects from the surface 10 is preferably water, this being sufficient to wet the wings of the insects and prevent same from flying and to wash the same into said catch basin. As said water flows into the catch basin it is permitted to rise to the level as indicated at 16, Fig. 2, which is the height of the inner wall 17, of the basin 14, while any further rise of liquid in said catch basin will be prevented owing to the flow of said liquid over the top of said wall 17. The inner wall 17 is preferably cylindrical and extends upwardly within the globe 5 terminating at a substantial distance below the edge 18 of the outer wall 19 of said basin, said globe being supported by brackets 20 carried by said wall 17, a passage 21 being provided between said globe and said wall 17 through which the liquid from the bottom of said catch basin is permitted to pass in escaping from said basin, the outer wall 19 of the basin 14 being higher than the wall 17. By extending said globe below the upper edge of the wall 17, the insects which are collected within said basin will be prevented from being washed out of said catch basin by the overflow, at least until a mass of insects has collected therein sufficient to completely occupy the space between the lower edge of said globe and the surface of said liquid, which space may be varied by raising or lowering said globe, thereby preventing clogging of the passage 21. After a certain number of said insects have been caught in said basin and before they will have a chance to settle below the lower edge of the globe 5, they are removed and destroyed. To facilitate the killing of the insects which are washed into said basin, a layer of oil of a suitable nature as indicated at 22 is provided upon the surface of the liquid 23 and into said oil said insects are immersed. The depth, however, of said oil is less than the depth to which the globe 5 extends below the level 16, and as said oil is lighter than the water it always remains at the surface permitting the water which is supplied from the coil 12 to pass therethrough to the bottom of the catch basin and upwardly through the passage 21 over the edge of the inner wall 17. From thence it escapes through the passage 24.

From the above descriptions it will be seen that simple and efficient means have been provided for accomplishing the objects of the invention, but while the elements herein shown and described are well adapted to perform the functions set forth, it is obvious that various minor changes may be made in the proportion, shape and arrangement of the several parts without departing from the spirit and scope of the invention as defined in the appended claims.

Having thus described my invention, what I claim and desire by Letters Patent to secure is:

1. An insect trap having, in combination, light creating instrumentalities, a transparent casing inclosing said instrumentalities and means to direct a film of liquid against substantially the entire outer surface of said casing.

2. An insect trap having, in combination, light creating instrumentalities, a transparent covering for said instrumentalities and means adapted to supply a continuous flow of liquid against substantially the entire exterior surface of said covering.

3. An insect trap having, in combination, a transparent casing, a lamp inclosed within said casing, and a liquid supply pipe arranged at the top of said casing, said supply pipe having a plurality of discharge orifices directed toward the adjacent portion of said casing adapted to discharge a volume of liquid over substantially the entire exterior surface of said casing.

4. A device of the class described having, in combination, a lamp, a transparent globe surrounding said lamp and provided with an opening at its lower end, a liquid supply pipe adapted to direct liquid against the outer face of said globe, a catch basin arranged adjacent the lower end of said globe, said basin having an outer wall surrounding the lower end of said globe and an inner wall projecting into the opening in said globe said inner wall being substantially lower than said outer wall and adapted to permit the superfluous liquid in said basin to overflow therefrom.

5. A device of the class described having, in combination, a lamp, a transparent globe surrounding said lamp and provided with an opening at its lower end, a liquid supply pipe adapted to direct liquid against the outer face of said globe, a catch basin arranged adjacent the lower end of said globe, said basin having an outer wall surrounding the lower end of said globe and an inner wall projecting into the opening in said globe said inner wall being substantially lower than said outer wall and adapted to permit the superfluous liquid in said basin to overflow therefrom and brackets on said outer wall adapted to support said globe with its lower edge at a substantial distance below the surface of the liquid in said catch basin, whereby the insects in said basin will not be carried off by said overflow.

In testimony whereof I have hereunto set my hand in presence of two subscribing witnesses.

WILLIAM A. NYE.

Witnesses:
 SYDNEY E. TAFT,
 ANNIE J. DAILEY.